(12) United States Patent
Khan et al.

(10) Patent No.: US 6,495,311 B1
(45) Date of Patent: Dec. 17, 2002

(54) BILAYER LIFTOFF PROCESS FOR HIGH MOMENT LAMINATE

(75) Inventors: Mahbub R. Khan, San Jose, CA (US); Jane Ellyn Nealis, San Jose, CA (US); Alfred Floyd Renaldo, San Jose, CA (US); John David Westwood, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/528,226

(22) Filed: Mar. 17, 2000

(51) Int. Cl.⁷ .............................. G03C 5/56; B44C 1/22
(52) U.S. Cl. ................ 430/313; 430/315; 430/311; 430/320; 430/329; 216/40
(58) Field of Search ................ 430/311, 313, 430/315, 320; 216/40

(56) References Cited

U.S. PATENT DOCUMENTS

| | | | |
|---|---|---|---|
| 4,569,897 A | 2/1986 | Kalyanaraman | 430/197 |
| 4,814,258 A | 3/1989 | Tam | 430/315 |
| 5,122,387 A | 6/1992 | Takenaka et al. | 427/493 |
| 5,147,740 A | 9/1992 | Robinson | 430/5 |
| 5,219,713 A | 6/1993 | Robinson | 430/314 |
| 5,264,981 A * | 11/1993 | Campbell et al. | 360/126 |
| 5,604,073 A | 2/1997 | Krounbi et al. | 430/14 |
| 5,922,503 A * | 7/1999 | Spak et al. | 430/269 |

FOREIGN PATENT DOCUMENTS

JP          4218053 A     8/1992

* cited by examiner

*Primary Examiner*—Mark F. Huff
*Assistant Examiner*—Daborah Chacko-Davis
(74) *Attorney, Agent, or Firm*—Robert O. Guillot; Intellectual Property Law Offices

(57) ABSTRACT

The magnetic tape recording head of the present invention is formed with magnetic poles that are comprised of a laminated NiFeN/FeN structure. The method for fabricating the magnetic poles utilizes an additive photolithographic technique including a bilayer liftoff resist. In this fabrication method magnetic pole trenches are formed in the bilayer liftoff resist such that an undercut exists in the liftoff layer. Thereafter, the laminated NiFeN/FeN structure is sputter deposited into the trench, followed by the wet chemical removal of the bilayer resist.

9 Claims, 2 Drawing Sheets

BILAYER LIFTOFF PROCESS FOR HIGH MOMENT LAMINATE

BACKGROUND OF THE INVENTION

1. Field of the Invention

The present invention relates generally to magnetic tape recording head devices, and more particularly to a process for fabricating magnetic poles for such heads utilizing a bilayer photoresist where the pole pieces are fabricated utilizing a metal sputtering process to form a laminated NiFeN structure.

2. Description of the Prior Art

To improve the performance characteristics of magnetic tape recording systems, new materials for forming the shields and poles of magnetic read/write heads and new manufacturing processes are continually being developed. Such magnetic head materials must be particularly wear resistant, as compared to materials for other,magnetic heads, in that physical contact between the magnetic tape and the magnetic head occurs during the read/write process. Therefore, many magnetic shield and pole forming materials utilized in manufacturing magnetic heads for hard disk drives are not suitable for use in magnetic tape head devices because the materials lack the required wear resistance properties necessary for magnetic tape heads.

A material that is suitable for use in a magnetic tape head is a high magnetic moment laminate material consisting of alternating layers of nickel iron nitride (NiFeN), and iron nitride (FeN). This laminate material can be created utilizing an RF diode sputter deposition process, such as is described in "Magnetic Properties of FeAlN Films at Elevated Temperatures" by P. Zheng, J. A. Bain, and M. H. Kryder in J. Appl. Phys. 81 (8), Apr. 15, 1997. The present invention is a magnetic head for magnetic tape systems that is composed of the NiFeN/FeN laminate material and a method for manufacturing it.

The manufacturing method of the present invention is an additive process. That is, generally, utilizing photolithographic techniques, a resist layer is formed on a substrate and holes or trenches of a desired shape are formed in the resist layer. A desired metal (or other material) layer is then deposited on top of a resist layer such that it fills the holes and trenches. Thereafter, the resist (along with the metalization layer on top of the resist) is next removed, such that the desired feature within the holes and trenches remains. This additive process is contrasted with a subtractive process which generally starts with the deposition of a metalization layer, followed by photolithographic steps which result in blocks of resist formed above areas of the metalization layer that are desired to be retained. Thereafter, the metalization layer is removed in all uncovered areas, leaving the portions of the metalization layer that are covered by the resist. The resist is then removed such that the desired metalization features remain. While the additive and subtractive processes generally described above may yield the same ultimate result, they are significantly different with regard to materials utilized, process parameters utilized and their suitability in the manufacturing of a particular device.

With regard to the NiFeN/FeN laminate metalization layers utilized in the present invention, the use of a subtractive process is generally unsuitable for manufacturing purposes because of the large quantity of NiFeN/FeN that must be removed, and particularly because the removal of the NiFeN/FeN laminate layers in a subtraction process must be accomplished utilizing a dry etching process, such as an ion beam etching process, which can result in the redeposition of removed material and significant clean up problems that result therefrom, as is well known to those skilled in the art. Wet chemical etching of the NiFeN/FeN, an alternative subtractive process, is not practical for manufacturing because the NiFeN and FeN layers etch at different rates, leaving ragged, poorly defined edges in the final patterned structure. Therefore, the present invention utilizes an additive process and, significantly, it utilizes a bilayer liftoff resist, as is generally known to those skilled in the art, which enables the removal of the NiFeN/FeN laminate utilizing a chemical solvent, thereby avoiding any redeposition problems and creating a manufacturing process that is suitable for commercial product development. Such a bilayer liftoff process is generally taught in U.S. Pat. No. 5,532,109, entitled: Azo Dyes as Adhesion Promotion Additive in Polydimethylglutarimide, issued Jul. 2, 1996 and naming as inventors Mohammad T. Krounbi, Alfred Renaldo (an inventor hereof) and Dougas Werner, and assigned to International Business Machines Corporation, the assignee hereof.

SUMMARY OF THE INVENTION

The magnetic tape recording head of the present invention is formed with magnetic poles that are comprised of a laminated NiFeN/FeN structure. The method for fabricating the magnetic poles utilizes an additive photolithographic technique including a bilayer liftoff resist. In this fabrication method magnetic pole trenches are formed in the bilayer liftoff resist such that an undercut exists in the liftoff layer. Thereafter, the NiFeN/FeN laminated structure is sputter deposited into the trench, followed by the wet chemical removal of the bilayer resist.

It is an advantage of the magnetic tape recording head of the present invention that it is fabricated with a laminated NiFeN/FeN structure.

It is another advantage of the magnetic tape recording head of the present invention that it is fabricated utilizing a bilayer photolithographic technique which reduces cleanup problems.

It is a further advantage of the fabrication method of the present invention that it utilizes photolithographic fabrication technique including a bilayer liftoff resist.

It is yet another advantage of the fabrication process of the present invention that the patterned structures of the sputter deposited NiFeN/FeN are well formed and free of distortion.

It is yet a further advantage of the fabrication process of the present invention that it utilizes an additive photoresist process including a bilayer photoresist, wherein undercuts are formed in the liftoff layer, such that clean edges of the sputter deposited NiFeN/FeN poles are formed.

These and other features and advantages of the present invention will no doubt become apparent to those skilled in the art upon review of the following detailed description which makes reference to the several figures of the drawings.

IN THE DRAWINGS

DETAILED DESCRIPTION OF THE PREFERRED EMBODIMENTS

Figure 1:
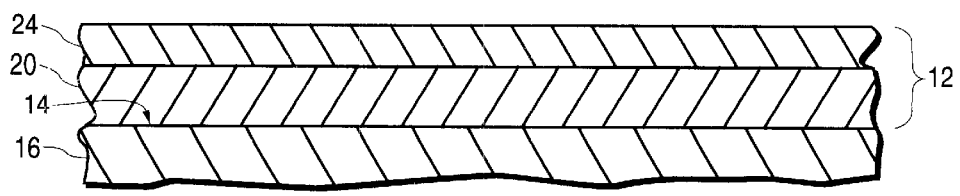
FIGS. 1–4 are side cross-sectional views depicting a bilayer photoresist liftoff process of the present invention.

FIGS. 1–4 are cross-sectional views generally depicting the bilayer liftoff process of the present invention for forming NiFeN/FeN high magnetic moment laminated structures. As depicted in FIG. 1, a bilayer resist 12 is formed on the upper surface 14 of a substrate 16. The bilayer resist 12 includes a first layer 20, termed a release layer, and a second, upper layer 24 that is composed of a suitable photoresist for use in photolithographic processing. The release layer 20 is preferably composed of Polydimethylglutarimide (PMGI), a polymer supplied by Microlithography Chemical Company (MCC) of Boston, Mass. While many photoresists may be effectively utilized as layer 24, a preferred photoresist is a negative i-line resist (i-300) as is supplied by the Shipley Company of Marlboro, Mass.

Figure 2:
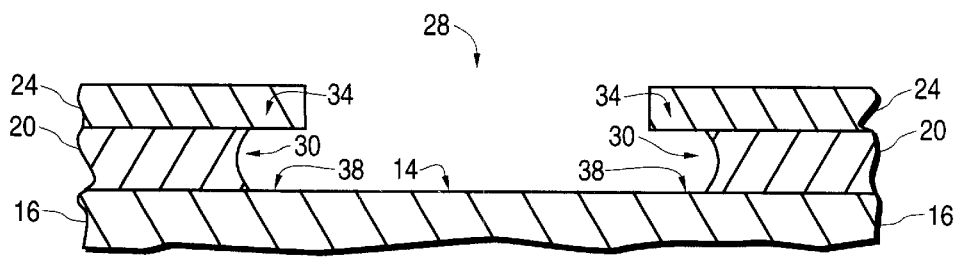

Thereafter, as depicted in FIG. 2, using well known photolithographic techniques, the device is baked, photoexposed, baked again and developed with a suitable developer that removes the unexposed photoresist in the photoresist layer 24. The developer may also remove portions of the PMGI release layer 20, or, alternatively the PMGI layer can be separately developed. Using either developing step the release layer 20 is developed to expose the substrate surface 14 through a hole or trench 28 that has been formed through the resist layer 24 and release layer 20. A desirable undercutting 30 of the release layer 20 beneath the resist layer 24 occurs during the development of the release layer 20. The undercut 30 is desirable because it causes the overhanging resist edge 34 to shield the outer portions 38 of the substrate surface 14 from unwanted deposition of the material that is next deposited.

Figure 3:
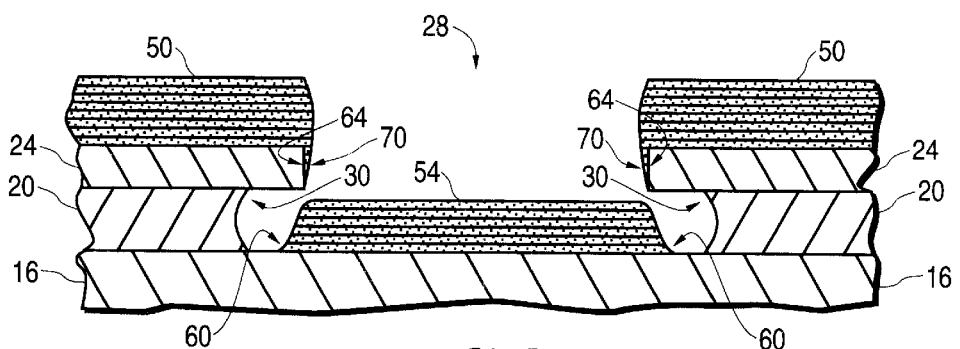

Thereafter, as depicted in FIG. 3, material (the NiFeN/FeN laminate) is deposited onto the structure such that portions 50 of the material are deposited on the upper surface of the resist layer 24 and portions 54 of the material are deposited into the hole or trench that has been photolithographically formed. Due to the resist overhang 34, the material 54 that is deposited into the photolithographic trench forms relatively smooth edges 60. Significantly, if the undercut 30 did not exist, then the walls 64 of the trench would extend in a relatively straight manner down to the substrate surface 14, and deposited material would exist on those wall portions, just as deposited material 70 exists on the vertical walls 64 of the resist layer 24. If such deposited material existed, it would be difficult to remove it, thereby complicating the manufacturing process. Therefore, the undercuts 30 beneath the overhang 34 of the resist layer 24 serve to provide good, clean edges 60 to the deposited structure 54.

Figure 4:
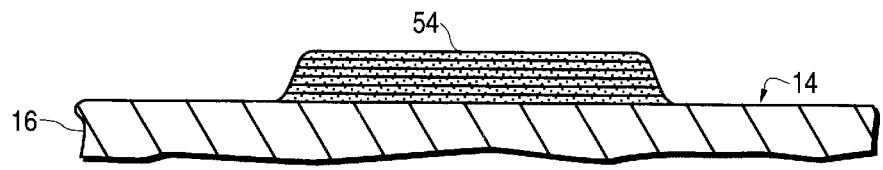

Following the material deposition step depicted in FIG. 3, an organic solvent which dissolves the PMGI release layer 20 is utilized to remove all of the unwanted material; that is, the release layer 20, the resist layer 24 and the material 50 on top of the resist layer, such that the desired structure 54 remains on the surface 14 of the substrate 16, as depicted in FIG. 4. A suitable organic stripper for PMGI is N-methyl pyrrolidone (NMP).

Figure 5:
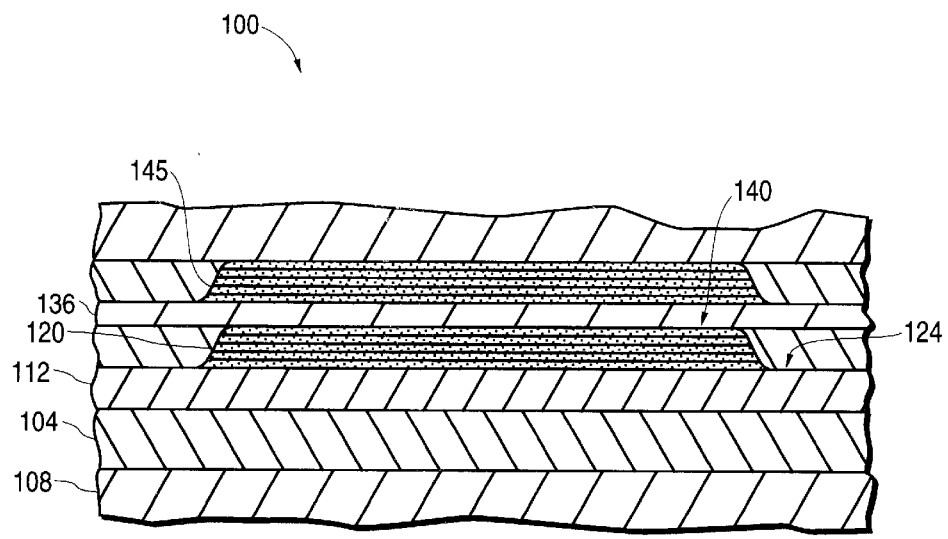
FIGS. 5 and 6 are side cross-sectional views of the fabrication process of the present invention that are specifically related to the NiFeN/FeN laminated magnetic poles of the magnetic tape recording head of the present invention.
Figure 6:
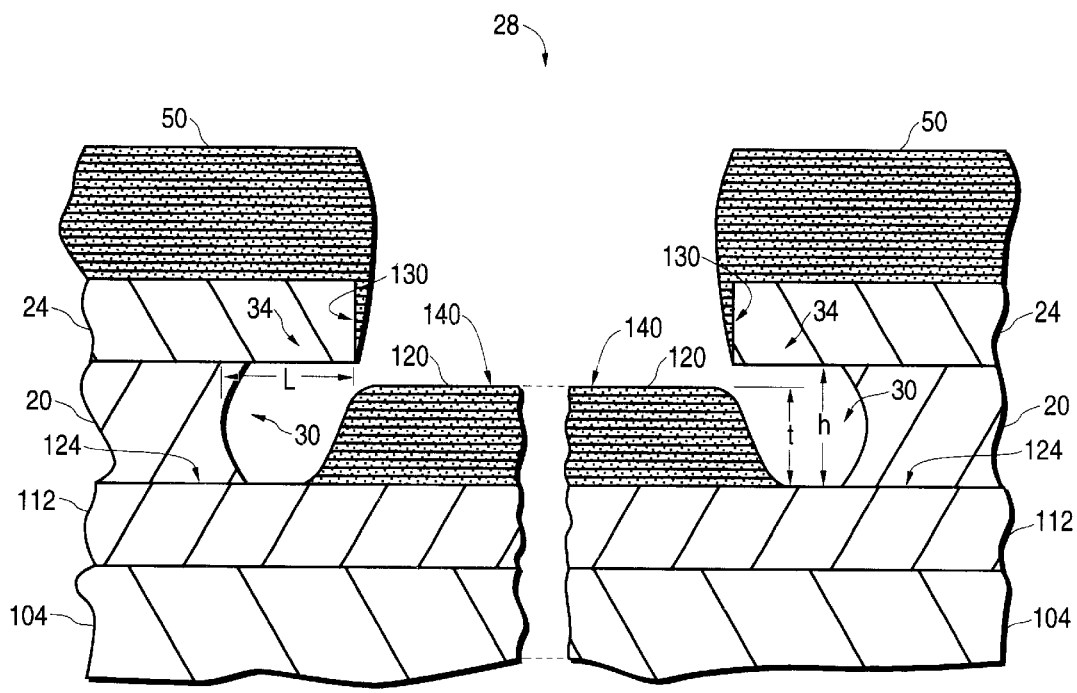

Having generally described the bilayer liftoff process of the present invention, the particular process materials and parameters of the present invention as utilized in the manufacturing of a magnetic head for magnetic tape systems are next discussed with the aid of FIGS. 5 and 6.

FIG. 5 is a cross-sectional view depicting the magnetic pole pieces of a magnetic head 100 of the present invention. As depicted in FIG. 5, an electromagnetic shield 104 is deposited upon a substrate base material 108 utilizing standard deposition techniques such as electroplating, sputter deposition and the like. An insulation layer 112 is thereafter formed on the shield 104 utilizing standard techniques. Thereafter, a first magnetic pole (P1) 120 is fabricated on the surface 124 of the insulation layer utilizing the bilayer liftoff fabrication process described hereinbelow. The P1 pole is composed of a NiFeN/FeN laminate structure.

FIG. 6 is a cross-sectional view depicting the bilayer liftoff resist structure of the P1 pole fabrication process. As depicted in FIG. 6, a PMGI release layer 20 is formed on the upper surface 124 of the insulation layer 112, and the photoresist layer 24 is formed on top of the release layer 20 and a hole or trench 28 has been photolithographically formed such that the undercuts 30 are formed in the release layer 20 beneath overhanging portions 34 of the resist layer 24. NiFeN/FeN laminate material is then deposited such that the P1 pole piece 120 is formed within the hole or trench 28, and NiFeN/FeN laminate material 50 is also deposited upon the upper surface of the resist layer 24.

As indicated above, the undercut 30 in the release layer 20 provides a valuable function in preventing the formation of edge deposits, or fences. In the preferred embodiment, where the P1 pole 120 has a thickness of approximately 1.5 $\mu$m, the release layer 20 is formed with a thickness h of approximately 2.0 $\mu$m, the resist layer 24 is formed with a thickness of approximately 1.0 $\mu$m, and the undercut 30 is formed with a length of approximately 2.0 $\mu$m from the edge 130 of the resist layer 24 at the hole or trench 28. While a deeper undercut 30 is permissible, although unnecessary in the manufacturing process of the present invention, an undercut 30 having a length that is less than approximately 50% of the thickness h of the release layer 20 will generally result in the unwanted deposition of fence material, thereby creating manufacturing and quality control difficulties.

After the P1 pole 120 has been deposited, the release layer 20 and material on top of it are chemically removed, as described hereabove. Thereafter, a write gap layer 136 is formed upon the top surface 140 of the P1 layer utilizing well known deposition techniques. Thereafter, a P2 pole layer 145 of laminated NiFeN/FeN approximately 1.5 $\mu$m thick is formed upon the write gap layer again utilizing the bilayer liftoff manufacturing process described hereabove. It is to be noted that other and intervening well known process steps utilized in fabricating additional magnetic tape head structural features are performed between or after the formation of the P1 and P2 poles as described hereabove, as would be well known to those skilled in the art. A detailed description of process steps involved in creating such well known additional tape head structures is not necessary to an understanding of the present invention, and is therefore not presented herein.

The high magnetic moment NiFeN/FeN laminate structure of the magnetic tape head of the present invention is deposited in a multi-layer sputtering process utilizing conventional RF diode, RF magnetron, or DC magnetron methods. Depending on the detailed deposition process, the wafer temperature may reach 150° C. The compressive stress in the NiFeN/FeN laminated film may be in the range from 500 MPa to 1.5 MPa according to the sputtering method and process conditions. A robust photoresist liftoff process is therefore required, wherein no movement or flow of the photoresist occurs under these process conditions. Additionally, a bilayer liftoff process facilitates the clean removal of both the robust photoresist layer and the NiFeN/FeN layers that are deposited upon the resist. The bilayer resist process is well known in the semiconductor processing industry, and has been applied in the manufacture of hard disk drive magnetic heads (termed DASD heads), and in both of these applications the thickness of the release layer is significantly less than that employed in the present invention because the metallization layers to be lifted off are considerably thinner. Specifically, whereas the release layer thickness in typical DASD manufacturing processes is approximately 0.2–0.3 µm, the thickness of the release layer 20 in manufacturing the tape heads of the present invention is approximately 2.0 µm. Such a thick release layer consequently requires an increased undercutting to avoid edge deposition or fencing of deposited material. In the present invention, the recommended undercutting is approximately equal to the thickness h of the release layer.

Another critical difference between prior art bilayer resist applications in the semiconductor and DASD head industries and the present invention is that the combined effects of NiFeN/FeN laminated film stress and thickness and wafer temperature during deposition place a significantly greater demand on the mechanical properties of the photoresist layers in the present invention. As thickness, stress, and temperatures increase, the forces that tend to distort the patterned structures in the photoresist in an unacceptable way increase as well.

The following examples illustrate the robustness of various bilayer photoresist structures with respect to fencing of deposited material and pattern distortion due to flow or deformation of the resist structure during processing:

A 125 mm (5 in) ceramic wafer was first coated with a dyed thick film version (SFN11) of polydimethylglutarimide (PMGI) from Microlithography Chemical Corp (MCC). Spinning at 1500 rpm (60 sec) and soft-baked on a hotplate (165–170 C., 450 sec) gave approximately a 2.0 µm thick release layer film. In a second step, a negative working photoresist, Ultra i-300 (Shipley corp.) was applied to the wafer at 2600 rpm (60 sec) and soft-baked at 105–110° C. (450 sec) to give a 1.0 µm thick resist layer film. The bilayer of PMGI and photoresist (approximately 3.0 µm total film thickness) was exposed to a mercury lamp (g–h lines) using an Ultratech stepper (UTS-1700) at doses ranging between 800–1200 mj/cm-2. After exposure the wafer was post-expose baked (PEB) at 105–110° C. (450 sec) and puddle developed (6×50 sec) in a dilute KOH developer (0.16 N, MP 2401 from Shipley Company diluted 1:6 in water, 22° C.). An acceptable undercut of the PMGI layer was generated by this method and determined to be 1.0–2.0 µm by optical inspection.

The photoprocessed wafer was cleaned with a hydrogen/ nitrogen plasma for 2 min in a barrel asher. Next, the high moment NiFeN/FeN laminate was deposited using a Balzers Z660 sputtering system. The laminate has the following structure: 200 Å NiFe/(600 Å FeN/200 Å NiFeN)$_{19x}$, in which the subscript denotes the number of repetitions of the alternating FeN and NiFeN layers. The total laminate thickness was approximately 1.5 µm. In this process the NiFeN layers are deposited by RF diode reactive sputtering from a Ni81.9Fe 18.1 (wt %) target at 2.0 kW power, $1.0 \times 10^{-2}$ mbar pressure, −35 V substrate bias, 99 sccm Ar gas flow and 6 sccm $N_2$ gas flow. The NiFe base layer is deposited using the same conditions except that no $N_2$ gas is used. The FeN layers are sputtered from an Fe target by reactive RF diode sputtering at 2.0 kW power, $1.0 \times 10^{-2}$ mbar pressure, −35V substrate bias, 58 sccm Ar gas flow and 10 sccm $N_2$ gas flow. The wafers were heat sunk to the pallet using Indium foil, and the pallet in turn is heat sunk to a water cooled substrate table. The substrate temperature rises to approximately 120° C. in the deposition. A magnetic field is applied to each wafer by permanent magnets to set the easy axis orientation of the film.

The wafer deposited with high moment laminate films was treated to hot NMP (55–60 C.) in a tank with sweep powered ultrasonics for 30–45 min. The excess laminate was removed with minimal metal fencing as was determined by optical inspection.

While the present invention has been shown and described with reference to certain preferred embodiments, it is contemplated by the inventors that those skilled in the art will develop certain alterations and modifications therein that nevertheless include the true spirit and scope of the invention. It is therefore intended that the following claims cover all such alterations and modifications that nevertheless include the spirit and scope of the present invention.

What is claimed is:

1. A method for fabricating a magnetic pole for a magnetic tape recording head, comprising the steps of:

forming a substrate layer;

forming a bilayer liftoff resist layer upon said substrate layer, said bilayer resist layer including a lower release layer and a top resist imaging layer;

photolithographically forming a pole trench within said bilayer liftoff resist layer, such that said release layer is formed with a thickness h, and is developed to have undercuts beneath portions of said top resist layer;

forming a magnetic pole using a sputtering process to deposit magnetic pole material within said trench, wherein the thickness t of said magnetic pole is no more than approximately 75% of h;

removing said bilayer liftoff resist layer; and encapsulating said magnetic pole.

2. A method for fabricating a magnetic pole for a magnetic tape recording head as described in claim 1 wherein said bilayer liftoff resist layer includes a lower release layer composed of polydimethylglutarimide and a top imaging resist layer composed of a negative photoresist.

3. A method for fabricating a magnetic pole for a magnetic tape recording head as described in claim 1 wherein said magnetic pole is formed from a laminated NiFeN/FeN structure.

4. A method for fabricating a magnetic pole for a magnetic tape recording head as described in claim 1 wherein said bilayer liftoff resist layer includes a lower release layer composed of polydimethylglutarimide and a top resist layer composed of a negative photoresist; and wherein said magnetic pole is formed fro m a laminated NiFeN/FeN structure.

5. A method for fabricating a magnetic pole for a magnetic tape recording head as described in claim 4 wherein said undercuts have a length of at least 50% of h.

6. A method for fabricating a magnetic pole for a magnetic tape recording head as described in claim 5 wherein said release layer is formed with a thickness h of approximately 2.0 µm and said top resist layer is formed with a thickness of approximately 1.0 µm and said undercuts have a length of approximately 1.0 µm.

7. A method for fabricating a magnetic pole for a magnetic tape recording head as described in claim 6 wherein said laminated NiFeN/FeN structure is formed with a thickness of approximately 1.5 microns.

8. A method for fabricating a magnetic pole for a magnetic tape recording head as described in claim 7 wherein said laminated NiFeN/FeN structure includes a detailed structure of approximately NiFe/(FeN/NiFeN)$_y$, in which the subscript denotes the number of repetitions of the alternating FeN and NiFeN layers, and wherein y is approximately 19.

9. A method for fabricating a magnetic pole for a magnetic tape recording head as described in claim 8 in which the detailed structure is approximately 200 Å NiFe/(600 Å FeN/200 Å NiFeN)19.

* * * * *